United States Patent
Young

[11] Patent Number: 5,773,734
[45] Date of Patent: Jun. 30, 1998

[54] NITRIDED POWDERED METAL PISTON RING

[75] Inventor: William B. Young, Hagerstown, Ind.

[73] Assignee: Dana Corporation, Toledo, Ohio

[21] Appl. No.: 576,428

[22] Filed: Dec. 21, 1995

[51] Int. Cl.[6] .............................. B22F 3/12; B22F 5/02; C22C 33/02

[52] U.S. Cl. .............................. 75/243; 75/244; 75/246; 419/11; 419/13; 419/28; 419/29; 419/38

[58] Field of Search .................. 419/5, 6, 7, 13, 419/26, 45, 58, 11, 28, 29, 38; 427/248.1; 75/244, 230, 243, 246; 428/552

[56] References Cited

U.S. PATENT DOCUMENTS

| 2,125,606 | 8/1938 | Deeb ............................ 148/16 |
| 2,741,827 | 4/1956 | Koehler ....................... 29/182 |
| 2,994,600 | 8/1961 | Hansen ......................... 75/5 |
| 5,226,975 | 7/1993 | Denton et al. ................ 148/220 |
| 5,292,381 | 3/1994 | Tsuchiya et al. ............. 148/318 |

FOREIGN PATENT DOCUMENTS 405059495A  3/1993  Japan.

*Primary Examiner*—Daniel J. Jenkins
*Attorney, Agent, or Firm*—Rader, Fishman & Grauer PLLC

[57] ABSTRACT

A powdered metal piston ring includes a structure of predominantly pearlite with a dispersion of metallic particles having an element with a high affinity for nitrogen. The ring is nitrided to form a hard surface layer at an outer periphery of the ring. The layer includes a first iron nitrided region and an adjacent region having greater hardness because of a reaction between the metallic particles and nitrogen. Preferred metallic particles include a high chromium steel alloy which forms part of the original powder metal of the piston ring.

20 Claims, 1 Drawing Sheet

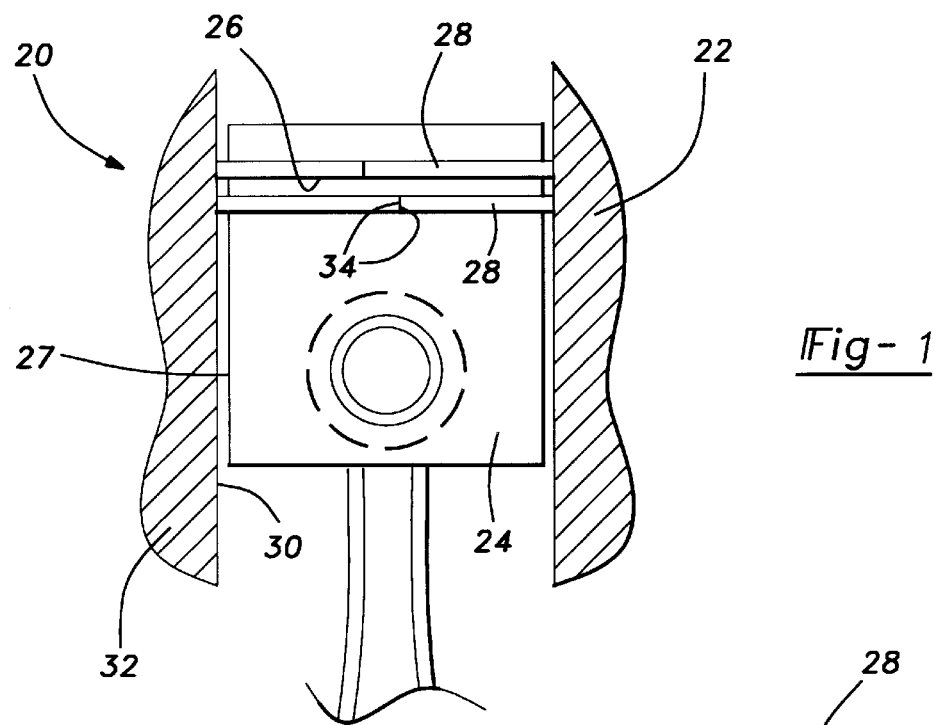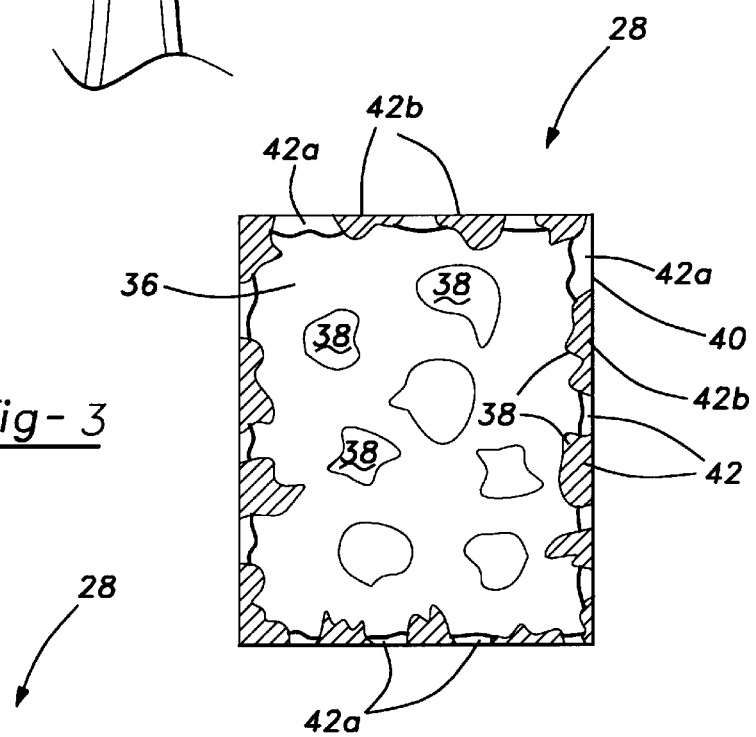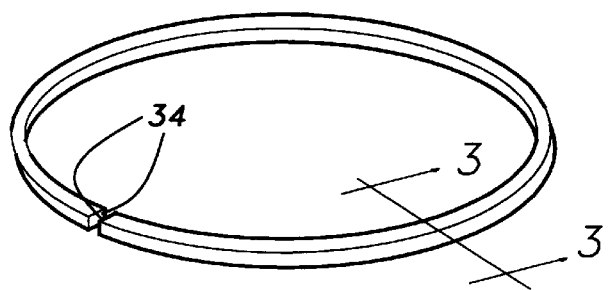

NITRIDED POWDERED METAL PISTON RING

BACKGROUND OF THE INVENTION

The present invention relates to a powdered metal piston ring that includes the use of a metallic powder with an element having a high affinity to nitrogen, wherein the completed ring is nitrided to create a metallic nitride outer surface layer.

Piston rings are well known. They are usually received within an annular groove disposed about an outer periphery of a piston. In turn, the piston is reciprocable within a cylinder. A piston compresses fluids such as gases within the cylinder. In an internal combustion engine these fluids force the piston away from the point of ignition. The outer surface or bearing face of a piston ring is subject to high temperatures, corrosion, and frictional interaction with the walls of the cylinder.

To improve durability, wear and scuff resistance, it is known to use a nitriding operation in conjunction with other methods. For example, it is known to form a gas nitrided layer on a steel wire piston ring as a base for a nickel-boron face coating. It is also known to form a gas nitrided layer on such a piston ring as a base for a titanium nitride face coating.

The prior art illustrates the use of a two-stage nitriding treatment, wherein a steel wire used to form a piston ring may include various levels of chromium. A plated layer, a sprayed layer or an ion plated layer may be inserted between a first nitrided layer and a second nitrided layer. A plasma nitriding operation is also illustrated in the prior art which involves a process of coating an engine part with a base layer of chromium and then subjecting the chromium layer to a gas plasma including nitrogen to form a chromium nitride surface layer on the chromium base layer.

Thus, the combination of nitriding treatments and face coating operations are taught in the prior art as the required means to provide proper wear resistance for traditional steel wire piston rings. Many of the same processes have also been used with grey cast iron piston rings.

Piston rings are known which are manufactured from powdered metal. Such rings typically include small percentages of manganese, chromium, or silicon to provide additional strength to the sintered piston ring body. It has been found, however, that such piston rings have not always performed acceptably because of the very high thermal and mechanical stresses imposed on them. Further, powdered metal piston rings are typically not as economical to manufacture when compared to grey cast iron and steel wire rings. Coating operations add substantially to the cost of the more traditional rings.

Finally, the prior art teaches a process of forming powdered metal parts wherein one of the powders has been preliminarily subjected to a nitriding operation to create iron nitride (Fe4N). Nitrogen containing gases which escape from the iron powder portion that has undergone treatment are apparently absorbed by the iron particles that have not underdone treatment.

SUMMARY OF THE INVENTION

A powdered metal piston ring of the present invention includes a structure of predominantly pearlite with a dispersion of metallic particles with a high affinity to nitrogen. A nitrided hard surface layer is formed at an outer periphery of the piston ring. The surface layer includes a first iron nitrided region and an adjacent region having greater hardness because of a reaction between the metallic particles and nitrogen.

In a preferred embodiment the metallic particles comprise a high chromium steel having between approximately 13 and 18 percent chromium. A preferred overall makeup of the ring includes between approximately 1 and 50 weight percent of the metallic particles and more preferably approximately 15 weight percent of such particles, between approximately 0 and 1.5 weight percent carbon, between approximately 0.00 and 2.0 weight percent of either copper or nickel, between 0 and 5.0 weight percent of an inorganic wax such as stearate/wax LV6, and a balance of predominantly iron.

A method of forming the powdered metal piston ring involves mixing a powder having the desired metallic particles as one of the components. Then the blended powder is pressed into a general shape of the ring. The powder is next sintered to form a structure including a dispersion of the metallic particles. The ring is machined into a final shape and then nitrided to form a surface layer about an outer periphery of the ring.

The use of a powdered metal ring including metallic particles such as a high chromium steel having a high affinity for nitrogen provides a number of advantages. First, the resulting surface gives substantially improved wear and scuff resistance, and a reduced coefficient of friction when compared to more traditional powdered metal parts without such metallic particles with an affinity for nitrogen. As noted above, powdered metal piston rings have not always performed acceptably because of the very high thermal and mechanical stresses imposed on them. The ring also has an unexpected cost advantage over more traditional steel wire and gray cast iron rings which have been subjected to numerous coating operations. The natural porosity of the powdered metal part provides better penetration during the nitriding operation when compared to more traditional piston rings. As a result, a harder part may be economically made with fewer processing steps.

BRIEF DESCRIPTION OF THE DRAWINGS

The inventive aspects of the present invention will become more apparent upon reading the following detailed description, claims, and drawings, of which the following is a brief description:

FIG. 1 is a cross-sectional view of a cylinder bore of an internal combustion engine with a piston incorporating a piston ring of the present invention.

FIG. 2 is a perspective view of a piston ring incorporating the present invention.

FIG. 3 is a cross-sectional view of the piston ring of FIG. 2 taken along lines 3—3.

DESCRIPTION OF A DETAILED EMBODIMENT

An assembly 20 is illustrated in FIG. 1 which includes a cylinder 22 with an annular piston 24 reciprocable within the cylinder. Piston 24 includes annular grooves 26 disposed about an outer peripheral surface. A one piece annular sealing member or piston ring 28 is mounted within each groove 26 to provide sealing engagement between piston 24 and an inner peripheral surface 30 of a cylinder wall 32. In the shown assembled orientation, circumferential ends 34 of piston ring 28 are adjacent each other.

Shown in greater detail in FIGS. 2 and 3, piston ring 28 is formed from powdered metal. The powder contains components that are known in the art to provide the basic physical properties of the ring. However, ring 28 also includes a metallic powder having at least one element with a great affinity for nitrogen. Such metallic powders include those with aluminum, vanadium, tungsten, molybdenum, or chromium. As a result, piston ring 28 may be nitrided at little additional cost to provide advantages typically seen in more traditional piston rings formed from grey cast iron or steel wire and then nitrided and given an additional face coating.

In a preferred embodiment, ring 28 includes a high chromium stainless steel powder. A typical metallurgical makeup of ring 28 includes 0.8-weight percent carbon, 2.0 weight percent of either copper or nickel, 2.0 weight percent stearate/wax LV6, 15.0 weight percent high chromium steel and the balance of predominantly iron. The stearate/wax LV6 is an example of an inorganic wax used to make the particles move more freely. It may also provide at least limited lubrication to the tooling. Carbon content may range between approximately 0.00 and 1.5 weight percent, the copper or nickel content between approximately 0.00 and 0.5 weight percent, the stearate/wax LV6 between 0.00 and 5.0 weight percent, and the high chromium steel powder between approximately 1 and 50 weight percent. If the percentage of high chromium steel powder is too low then the nitriding process discussed below will be unduly compromised. Cost becomes a factor if the percentage of high chromium steel powder is too high, but a higher percentage will aid rather than hinder nitriding.

There are a number of alloy steels that may be used as the high chromium steel powder. A most preferred group of alloys is martensitic stainless steels including those in the 400 series such as 420, 440A, B and C. The percentage of chromium in this group ranges between approximately 11 and 20 percent. A second preferred group of alloys is austenitic stainless steels such as those in the 200 and 300 series which include approximately 18 percent chromium.

Another possible group of chromium alloy steels is nitroalloy's G, 135M (SAE7190), N and EZ. This latter group includes alloys with both aluminum and chromium to attract nitrogen during a nitriding operation. However, there typically is between only 1 and 2 percent chromium. It may be possible to use medium carbon chromium containing low-alloy steels in the 4100, 4300, 5100, 6100, 8600, 8700, 9300 and 9800 series. The chromium content for these steels are only between 0.5 and 1.5 percent. Hot work die steels containing 5 percent chromium such as H11, H12, and H13 may be used as well.

Once an acceptable powder blend is made which includes the basic physical properties of the desired piston ring plus a metallic powder that includes at least one element having a great affinity for nitrogen, the ring is pressed into shape. Typically, the blended powder is fed into a die and pressed at approximately 40 tons per square inch. An acceptable range of pressing involves pressures between approximately 20 and 60 tons per square inch.

After the blended powder is pressed, it is sintered between 1800° and 2250° F. (982° and 1232° C.) for approximately four hours. Preferably, the blended pressed powder is sintered at approximately 2100° F. (1150° C.). The ring metallurgy changes during the sintering process. The general structure 36 of ring 28 is made up of a typical powdered metal carbon micro-structure, being predominantly pearlite with traces of carbide and some porosity. Particles 38, formed from the metallic powder, are also dispersed in structure 36. Some of the particles 38 lay at an outer periphery 40 of ring 28. A machining operation places ring 28 in its final shape.

Finally, piston ring 28 is nitrided using a gas, ion or salt nitriding process. A gas nitriding process is generally preferred because it is less expensive and will affect all surfaces of ring 28. When using a gas nitriding process, a nitrogen containing gas defuses into piston ring 28 to create a hard surface layer 42 at least at the outer periphery 40. Layer 42 comprises nitrided iron regions 42a having a maximum hardness of approximately 600 Vickers diamond hardness ("HV") and adjacent regions 42b comprising nitrided particles formed from particles 38. The particles comprising regions 42b have deeper penetration and higher hardness because of the reaction between the nitrogen gas and the elements within particles 38 having a strong affinity for nitrogen. When a high chrome steel is used, for example, regions 42b form chromium nitride having a hardness of approximately 1200 HV. The coating thickness is normally approximately 0.003 inches (0.08 mm), but may vary between 0.001 inches (0.03 mm) and 0.005 inches (0.13 mm).

The use of powdered metal including metallic particles having at least one element with a high affinity for nitrogen such as chromium provides a number of advantages. The resulting surface gives substantially improved wear and scuff resistance as well as a reduced coefficient of friction when compared to traditional powdered metal parts without such metallic particles. Chromium is particularly desired because of its natural affinity for nitrogen, corrosion resistance, and cost.

The present invention has economic advantages over the use of traditional steel wire or cast iron rings. Additionally, however, the natural porosity of a powdered metal part in combination with the presence of metallic particles having a strong affinity for nitrogen provide better penetration and increased hardness during the nitriding operation. As a result, a harder part may be made at lower cost and with fewer process steps. A separate face coating applied to the nitrided layer is not required.

A preferred embodiment of the present invention has been described. It is to be understood that variations and modifications may be employed without departing from the scope of the present invention. Accordingly, the following claims should be studied to determine the true scope of the present invention.

What is claimed is:

1. A powdered metal piston ring comprising:
   a structure of predominantly pearlite with a dispersion of separate and discrete metallic particles including at least one element with a high affinity to nitrogen;
   a nitrided hard surface layer formed at an outer periphery of said ring, said surface layer including a first iron nitrided region and an adjacent region having greater hardness formed by a reaction between said metallic particles and nitrogen.

2. A powdered metal piston ring as recited in claim 1, wherein said element comprises chromium.

3. A powdered metal piston ring as recited in claim 2, wherein said metallic particles comprise a high chromium steel.

4. A powdered metal piston ring as recited in claim 3, wherein said ring includes between 1 and 50 percent of said high chromium steel.

5. A powdered metal piston ring as recited in claim 4, wherein said chromium steel comprises between 11 and 20 percent chromium.

6. A powdered metal piston ring as recited in claim 4, wherein said ring includes approximately 15 percent of said high chromium steel.

7. A powdered metal piston ring as recited in claim 6, wherein said ring includes approximately 0.8 percent carbon, approximately 2.0 percent of one of copper and nickel, approximately 2 percent of an inorganic wax and a balance of predominantly iron.

8. A powdered metal piston ring as recited in claim 4, wherein said ring includes between approximately 0 and 1.5 percent carbon, approximately 0 and 2.0 of one of copper and nickel, between approximately 0 and 5.0 percent of stearate/wax LV6, and a balance of predominantly iron.

9. A method of forming a powdered metal piston ring comprising the steps of:

blending a powder of between approximately 0 and 1.5 percent carbon, between approximately 0 and 0.5 percent of one of copper and nickel, between 1 and 50 percent of a metallic powder having a high affinity for nitrogen, and a balance of predominantly iron;

pressing said blended powder into a general shape of said ring;

sintering said blended powder after said pressing step and forming a structure including a dispersion of separate and discrete metallic particles consisting of said metallic powder;

machining said ring into a final shape;

nitriding an outer periphery of said ring to create a hard surface layer having a first region of iron nitride and an adjacent region of greater hardness because of a reaction between said metallic particles and nitrogen.

10. A method as recited in claim 9, wherein said metallic powder comprises a chromium steel.

11. A method as recited in claim 10, wherein said chromium steel comprises approximately 15 percent of said ring.

12. A method as recited in claim 11, wherein said chromium steel comprises between approximately 11 and 20 percent chromium.

13. A method as recited in claim 9, wherein said powder includes between approximately 0 and 5.0 percent stearate/wax LV6.

14. A method as recited in claim 9, wherein said pressing involves pressures of approximately 40 tons per square inch.

15. A method as recited in claim 14, wherein said sintering involves a temperature of approximately 2100° F. for approximately 4 hours.

16. A method as recited in claim 9, comprising a machining operation to trim said ring to its final shape.

17. A method as recited in claim 16, wherein said nitriding involves one of a gas, ion and salt nitriding processes.

18. A method as recited in claim 17, wherein said hard surface layer has a depth of approximately 0.003 inches.

19. A powdered metal piston ring comprising:

a structure of predominantly pearlite with a dispersion of metallic particles including at least one element with a high affinity to nitrogen, wherein said element comprises chromium and said metallic particles comprise a high chromium steel, said ring including between 1 and 50 percent of said high chromium steel and said chromium steel comprises between 11 and 20 percent chromium; and a nitrided hard surface layer formed at an outer periphery of said ring, said surface layer including a first iron nitrided region and an adjacent region having greater hardness formed by a reaction between said metallic particles and said nitrogen.

20. A method of forming a powdered metal piston ring comprising the steps of:

blending a powder of between approximately 0 and 1.5 percent carbon, between approximately 0 and 0.5 percent of one of copper and nickel, between 1 and 50 percent of a metallic powder having a high affinity for nitrogen, and a balance of predominantly iron, wherein said metallic powder comprises a chromium steel and wherein said chromium steel comprises approximately 15 percent of said ring;

pressing said blended powder into a general shape of said ring;

sintering said blended powder after said pressing step and forming a structure including a dispersion of metallic particles consisting of said metallic powder;

machining said ring into a final shape; and nitriding an outer periphery of said ring to create a hard surface layer having a first region of iron nitride and an adjacent region of greater hardness because of a reaction between said metallic particles and nitrogen.

* * * * *